Feb. 9, 1937. T. L. CHISHOLM ET AL 2,070,421
REFRIGERATING APPARATUS
Filed July 31, 1929
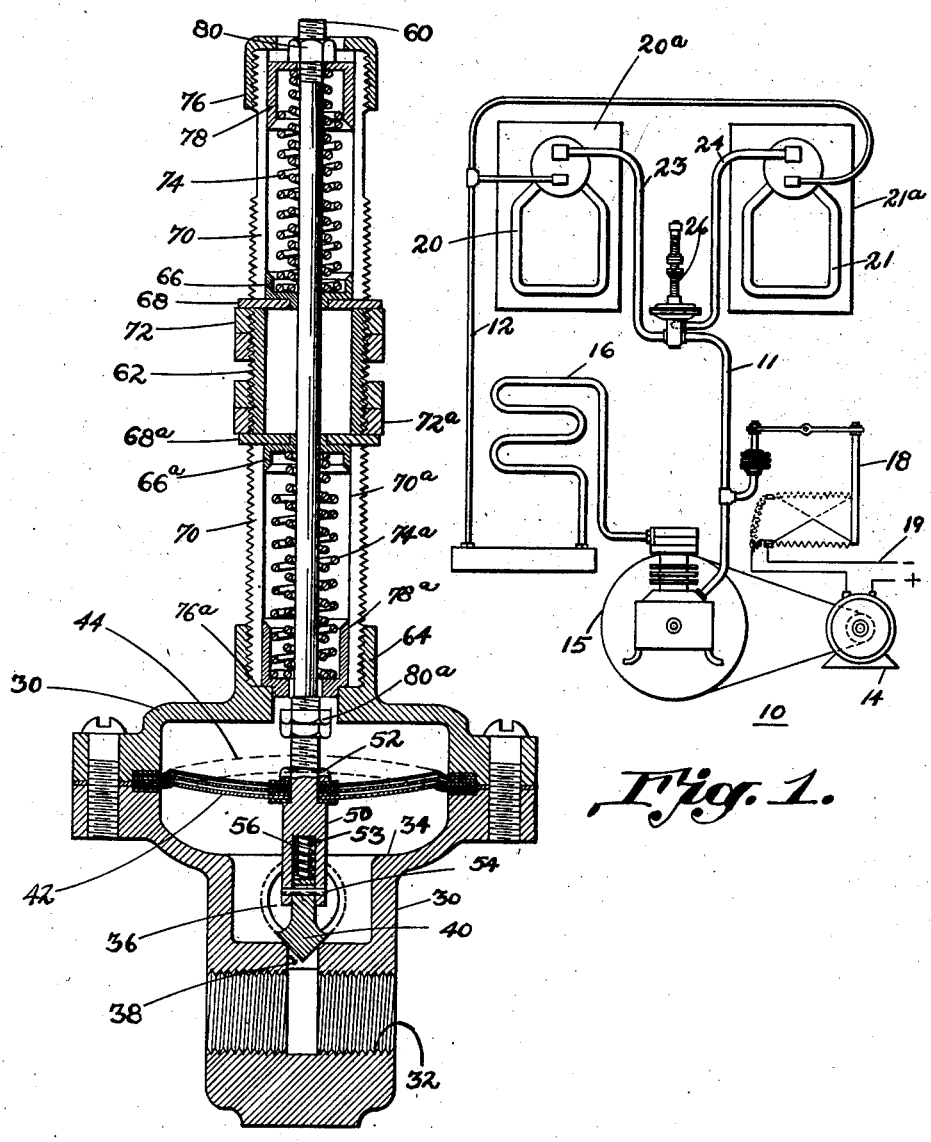

Patented Feb. 9, 1937

2,070,421

UNITED STATES PATENT OFFICE 2,070,421

REFRIGERATING APPARATUS

Theodore L. Chisholm and David E. Maccabee, Dayton, Ohio, assignors, by mesne assignments, to General Motors Corporation, a corporation of Delaware Application July 31, 1929, Serial No. 382,496

10 Claims. (Cl. 137—153)

This invention relates to refrigerating apparatus and particularly to means for controlling the circulation of refrigerant in such apparatus.

One of the objects of the invention is to provide an improved valve for automatically controlling, in accordance with predetermined conditions, the refrigeration produced by a refrigerating element.

Another object is to provide a simple, reliable and inexpensive valve which will automatically positively close or positively open a conduit in response to the pressure existing therein.

Another object is to provide a pressure responsive control actuator of the diaphragm type which has independent means for adjusting the high and low values of pressure which operate the device.

Further objects and advantages of the present invention will be apparent from the following description, reference being had to the accompanying drawing, wherein a preferred form of the present invention is clearly shown.

In the drawing:

Fig. 1 is a diagrammatic representation of one form of refrigerating system embodying the invention; and Fig. 2 is a sectional view showing the construction of a control valve of the system.

It has previously been proposed to provide a number of evaporators which are supplied with refrigerant from a common condensing element and to operate the system so as to maintain the different evaporators at different temperatures. This is accomplished in one type of system by connecting to a common suction line a number of evaporators of the flooded type in which the pressure of each evaporator bears a direct relation to its temperature, operating the condensing element to maintain a low pressure, and maintaining each individual evaporator between some selected pressure limits above the pressure of the common suction line by opening and closing a valve in the outlet of each evaporator in response to the pressure of such evaporator. In arrangements of this character it has been proposed to provide a snap-acting pressure responsive valve at the junction of the individual evaporator to be controlled and the common suction line, this valve either fully opening the connection in response to a high pressure or positively closing the connection in response to a predetermined low pressure.

This invention is concerned with providing an improved automatic pressure responsive valve which is particularly adapted to be used for controlling the pressure in evaporators of the type of system described.

Referring to the drawing 10 designates in general a condensing element for withdrawing gaseous refrigerant from a vapor conduit 11, liquefying the refrigerant and delivering it to a liquid supply conduit 12. The condensing element may be of any desired type, for example it may include the usual motor 14, compressor 15 and condenser 16, the motor being actuated in response to the pressure within the conduit 11 by means of an automatic switch 18 which connects the motor to power mains 19. Evaporators 20 and 21 are connected in parallel between the liquid supply conduit and the vapor exhaust conduit 11 for cooling compartment 20a and 21a. The evaporators are connected to the conduit 11 by means of independent outlet conduits 23 and 24. Preferably each of the evaporators is of the flooded type and includes a reservoir for liquid refrigerant which is kept at a constant level therein by means of a float valve, not shown herein but fully disclosed in the patent to Osborn 1,556,708, October 13, 1925. Since the evaporators are of the flooded type, the pressure of the refrigerant in each will correspond to its temperature. Assuming that the evaporator 21 is to be kept at the higher temperature and pressure, we place in the outlet of this evaporator a shut-off valve 26, the construction of which is illustrated in Fig. 2.

The valve 26 includes a casing 30 having a passage 32 which is to be connected between the outlet conduit 23 and the vapor conduit 11. A pressure chamber 34 has inlet 36 to which the conduit 24 leading from evaporator 21 is connected, and a passage 38 controlled by a valve 40 for establishing communication between the conduit 24 and the passage 32. One wall of the pressure chamber 34 is formed by a diaphragm 42 which has the property of remaining permanently flexed in either of two equilibrium positions until positively moved to the other position. One of these positions is indicated by the position of the diaphragm as shown in Fig. 2 and the other position is indicated by the dotted line 44. Preferably the diaphragm is very stiff so as to require a relatively large force to move it from one position to the other. This stiffness may be attained for example by constructing a diaphragm of a plurality of separate layers which are spaced apart at their edges by peripheral spacers and spaced apart at the center by central spacers. The diaphragm layers and spacers may be held together in any suitable manner for example by clamping the edges between the complementary halves of the casing 30 and by clamping the center together by any suitable tie means which may be formed by a valve actuator 50 and nut 52. The valve 40 is supported on the actuator by being positioned in a bore 53, and held by the pin 54. Preferably the pin has a slight clearance in the valve, for example ten or fifteen thousandths of an inch and the valve is urged downward against the pin by a light spring 56. This distance is very small compared to the total travel of the valve, which may be a quarter of an inch, and is to prevent unseating of the valve sufficient to produce a leak in the event that the diaphragm should bulge or creep slightly before snapping. In the position shown in Fig. 2 the valve prevents communication between evaporator 21 and the condensing element, the tension of the diaphragm holding the valve firmly against the seat. As the temperature and pressure of the evaporator 21 increases the pressure gradually builds up in the chamber 34 but the diaphragm does not move until the pressure reaches a definite high value when the diaphragm is suddenly snapped from the full line to the dotted line position. In this position the valve is fully open to permit unrestricted communication between the evaporator 21 and the suction conduit 11. When the pressure thereafter reaches a predetermined low value the diaphragm snaps suddenly from the dotted line to the full line position, positively closing the outlet of the evaporator 21.

In order to adjust the values of pressures which open and close the valve the diaphragm is provided with independent means for assisting it to move from either equilibrium position toward the other. In the example shown in Fig. 2 this includes a rod 60 which passes through a spring barrel 62 which may be supported by being threaded into a boss 64 on the valve housing. Adjacent the center of the spring barrel is an adjustable spring abutment which includes a spring cup 66 resting on a washer 68 which has lugs protruding through slots 70 in opposite sides of the spring barrel and rests upon an adjusting nut 72. The cup 66 supports the spring 74 which may be any desired form of compression spring but is preferably a compound spring composed of two separate helical springs wound in opposite directions to prevent enmeshing of the convolutions as disclosed in the application of Jesse G. King, Serial No. 124,160, filed July 22, 1926. Expansion of the spring beyond a certain point is prevented by a spring stop in the form of a cap 76 threaded on the end of the barrel and engaging a cup 78 at the upper end of the spring.

Spring 74 assists the valve 40 to open by exerting force on the adjustable abutment 80 threaded on the rod 60 which is rigidly attached to the center of the diaphragm, being preferably formed integral with the valve actuator 50. The distance along the rod 60 between the stop 76 and the abutment 80 is preferably approximately half the travel of the center of the diaphragm, in order that after the diaphragm has been snapped the influence of the opening spring 74 will be removed from the diaphragm. The actual distance between these stops will depend upon the stiffness of the diaphragm and the pressures at which it operates, but ordinarily is between 40% and 60% of the travel of the diaphragm and preferably about 45% to 48%. This amount I term not substantially more than half of the travel of the diaphragm.

A counterpart of the opening adjustment is found in the closing adjustment including a spring cup 66a, abutment 68a, adjusting nut 72a, slot 70a, spring 74a, spring stop 76a, conveniently formed by the abutment of the boss 64, spring cup 78a and rod abutment 80a. The closing adjustment acts in all respects like the opening adjustment except in the opposite direction.

It will be observed in Fig. 2 the valve is closed and the opening spring, being compressed by the stop 76 is exerting force on the diaphragm, the amount of this force being regulated by the position of the nut 72. As the diaphragm snaps to the open position the spring 74 is checked by the stop 76 and the abutment 80a compresses the spring 74a, the diaphragm coming to rest on the dotted line position. In this position the spring 74a exerts force tending to close the valve and the spring 74 is entirely removed as far as any influence on the diaphragm is concerned. Thus the amount of force which is applied to the diaphragm tending to open it can be adjusted by varying the position of nut 72a without in any way affecting the value of the pressure which opens the valve because this is entirely controlled by the independent spring 74.

The automatic switch 18 is set to operate at low pressures corresponding to the temperatures to be maintained in the evaporator 20. Whenever the temperature of 20 is above the maximum permissible value, the pressure of the refrigerant will actuate the switch 18 to operate the condensing element. Under these conditions refrigerant will not be evaporated in the evaporator 21 unless the valve 26 is open. Whenever the valve is open, the condensing element will reduce the pressure and temperature of the evaporator 21 to its lowest permissible value (which is above the setting of the switch 18) at which point the valve will close to prevent further refrigeration in 21. If the evaporator 20 should at any time be within its normal temperature limits, and the condensing element consequently be idle, and the evaporator 21 should become too warm, the pressure in 21 will open the valve and allow the high pressure to be communicated to the conduit 11 and switch 18. Since this high pressure is above the value which closes the switch, the switch will be operated immediately to start the condensing element. Refrigerant will then be withdrawn from both evaporators until both have reached their minimum permissible temperature. If the evaporator 21 reaches its minimum temperature first, the valve 26 will close to prevent further refrigeration, and the condensing element will continue to refrigerate the evaporator 20. If, however, the evaporator 20 should reach its minimum temperature first, the valve will remain open, and the pressure of the refrigerant evaporated in 21 will keep the switch open. However, since each evaporator contains a relatively large quantity of liquid refrigerant, whose pressure corresponds to its temperature, the rates of evaporation of the liquid will correspond with the pressures. Hence refrigerant will be evaporated rapidly in 21 and quickly reduce its temperature, whereas refrigerant will be evaporated but slowly in 20, and thus its temperature will not be reduced to a value appreciably below its normal minimum value.

While the form of embodiment of the invention as herein disclosed, constitutes a preferred form, it is to be understood that other forms might be adopted, all coming within the scope of the claims which follow.

What is claimed is as follows:

1. A snap-acting pressure responsive actuator comprising in combination a flexible diaphragm adapted to remain flexed in either of two equilibrium positions until snapped to the other position by a change of pressure, and independent means for adjusting the high and low values of pressure for operating the actuator including resilient means tending to move the diaphragm from its low pressure position, a second resilient means independent of the influence of the first resilient means tending to move the diaphragm from its high pressure position, and independent means for preventing at all times the full expansion of said resilient means.

2. A snap-acting pressure responsive actuator comprising in combination a flexible diaphragm adapted to remain flexed in either of two equilibrium positions until snapped to the other position by a change of pressure, and independent means for adjusting the high and low values of pressure for operating the actuator including adjustable confined spring means tending to move the diaphragm from its low pressure position, and a second adjustable confined spring means independent of the influence of the first adjustable means tending to move the diaphragm from its high pressure position, each of said adjustable confined spring means being so confined at all times to prevent full expansion of said spring means so as to exert force on the diaphragm only during a portion of its movement from one equilibrium position to the other.

3. A snap-acting pressure responsive actuator comprising in combination a flexible diaphragm adapted to remain flexed in either of two equilibrium positions until snapped to the other position by a change of pressure, and independent means for adjusting the high and low values of pressure for operating the actuator including adjustable confined spring means tending to move the diaphragm from its low pressure position, and a second adjustable confined spring means independent of the influence of the first adjustable means tending to move the diaphragm from its high pressure position, each of said adjustable confined spring means being so confined at all times to prevent full expansion of said spring means so as to exert force on the diaphragm only during substantially half of its movement from one equilibrium position to the other.

4. A snap-acting pressure responsive actuator comprising in combination a flexible diaphragm adapted to remain flexed in either of two equilibrium positions until snapped to the other position by a change of pressure, and independent means for adjusting the high and low values of pressure for operating the actuator including an adjustable spring tending to move the diaphragm from its low pressure position, a second adjustable spring tending to move the diaphragm from its high pressure position, and means for preventing the full expansion of each of said springs for limiting the movement of each spring to less than the maximum movement of the diaphragm.

5. A pressure control device comprising in combination a pressure chamber, a flexible diaphragm forming one wall of the chamber, said diaphragm being adapted to remain in either of two equilibrium positions until snapped to the other position by a change of pressure in the chamber, a valve actuator secured to the diaphragm, a valve connected to the actuator by a lost-motion connection for permitting or preventing the flow of fluid through the chamber, the amount of movement in said lost-motion connection being small in proportion to the movement of the diaphragm, means for regulating the pressure at which the diaphragm will snap in one direction, means for regulating the pressure at which the diaphragm will snap in the other direction, and means for varying the effect of one of said means without disturbing the effect of the other of said means.

6. A snap-acting pressure responsive actuator comprising in combination a flexible diaphragm adapted to remain flexed in either of two equilibrium positions until snapped to the other position by a change of pressure, a spring barrel, a pair of opposed compression springs in alignment in said barrel, an abutment for one end of each spring adjacent the center of the barrel, a spring cap for the other end of each spring, a stop for each spring cap, a rod secured to the diaphragm and passing through the barrel, and an abutment adjacent each end of the rod for compressing one of said springs, the distance between the stops being less than the distance between said last mentioned abutments.

7. A snap-acting pressure responsive actuator comprising in combination a flexible diaphragm adapted to remain flexed in either of two equilibrium positions until snapped to the other position by a change of pressure, a spring barrel, a pair of opposed compression springs in alignment in said barrel, an abutment for one end of each spring adjacent the center of the barrel, a spring cap for the other end of each spring, a stop for each spring cap, a rod secured to the diaphragm and passing through the barrel, and an abutment adjacent each end of the rod for compressing one of said springs, the relation between the rod abutments and spring stops being such that each spring opposes movement of the diaphragm through not more than approximately half of its travel.

8. A snap-acting pressure responsive actuator comprising in combination a flexible diaphragm adapted to remain flexed in either of two equilibrium positions until snapped to the other position by a change of pressure, a spring barrel, a pair of opposed compression springs in alignment in said barrel, an abutment for one end of each spring adjacent the center of the barrel, a spring cap for the other end of each spring, a stop for each spring cap, a rod secured to the diaphragm and passing through the barrel, and an abutment adjacent each end of the rod for compressing one of said springs, the relation between the rod abutments and spring stops being such that each spring opposes movement of the diaphragm through less than half of its travel.

9. A snap-acting pressure responsive actuator comprising in combination a flexible diaphragm adapted to remain flexed in either of two equilibrium positions until snapped to the other position by a change of pressure, a spring barrel, a pair of opposed compression springs in alignment in said barrel, an abutment for one end of each spring adjacent the center of the barrel, a spring cap for the other end of each spring, a stop for each spring cap, a rod secured to the diaphragm and passing through the barrel, and an abutment adjacent each end of the rod for compressing one of said springs, the distance between either spring stop and its associated rod abutment being approximately half the travel of the diaphragm.

10. In a snap-acting pressure responsive actuator, a flexible snap acting diaphragm adapted to remain flexed in either of two equilibrium positions until snapped to the other position by a change of pressure, said diaphragm including a plurality of separate superposed single ply layers, each layer being provided with an annular bead for providing resiliency, peripheral separating means holding the layers in spaced relation, central spacing means between the layers, and central tie means holding the layers together.

THEODORE L. CHISHOLM.
DAVID E. MACCABEE.